(12) United States Patent
Tyler et al.

(10) Patent No.: US 10,932,325 B2
(45) Date of Patent: Feb. 23, 2021

(54) ADDITIVE MANUFACTURING SYSTEM AND METHOD FOR DISCHARGING COATED CONTINUOUS COMPOSITES

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 366 days.

(21) Appl. No.: 15/893,327

(22) Filed: Feb. 9, 2018

(65) Prior Publication Data

US 2018/0229429 A1 Aug. 16, 2018

Related U.S. Application Data

(60) Provisional application No. 62/459,398, filed on Feb. 15, 2017.

(51) Int. Cl.
*B33Y 10/00* (2015.01)
*H05B 3/28* (2006.01)
(Continued)

(52) U.S. Cl.
CPC ........... *H05B 3/286* (2013.01); *B29C 64/165* (2017.08); *B29C 64/209* (2017.08);
(Continued)

(58) Field of Classification Search
CPC ....... B33Y 10/00; B33Y 70/00; B29C 64/165; B29C 70/207; B29C 70/384; B29C 70/881
(Continued)

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Jeffrey M Wollschlager
*Assistant Examiner* — Xue H Liu
(74) *Attorney, Agent, or Firm* — Ryan C. Stockett

(57) ABSTRACT

A system is disclosed for additively manufacturing a composite structure. The system may include a print head configured to receive a continuous reinforcement, and at least one of a matrix jet and a matrix bath configured to wet the continuous reinforcement with a liquid matrix during passage through the print head. The system may also include a coating mechanism configured to dispense at least one of metallic and ceramic particles onto the wetted continuous reinforcement during passage through the print head, and at least one cure enhancer configured to at least one of cure the liquid matrix and cause the at least one of metallic and ceramic particles to coalesce around the continuous reinforcement. The system may further include a support configured to move the print head in multiple dimensions during discharging.

19 Claims, 3 Drawing Sheets

(51) Int. Cl.

| | |
|---|---|
| *B33Y 70/00* | (2020.01) |
| *B29C 64/165* | (2017.01) |
| *B29C 70/88* | (2006.01) |
| *B33Y 30/00* | (2015.01) |
| *B29C 64/232* | (2017.01) |
| *B29C 64/245* | (2017.01) |
| *B29C 64/209* | (2017.01) |
| *B29C 64/236* | (2017.01) |
| *B29C 64/241* | (2017.01) |
| *B29C 70/20* | (2006.01) |
| *B29C 70/38* | (2006.01) |
| *C01B 32/194* | (2017.01) |
| *B29C 64/291* | (2017.01) |
| *B29C 64/393* | (2017.01) |
| *B33Y 80/00* | (2015.01) |
| *B29L 31/00* | (2006.01) |
| *B29K 101/10* | (2006.01) |

(52) U.S. Cl.
CPC .......... *B29C 64/232* (2017.08); *B29C 64/236* (2017.08); *B29C 64/241* (2017.08); *B29C 64/245* (2017.08); *B29C 64/291* (2017.08); *B29C 64/393* (2017.08); *B29C 70/207* (2013.01); *B29C 70/384* (2013.01); *B29C 70/885* (2013.01); *B33Y 10/00* (2014.12); *B33Y 30/00* (2014.12); *B33Y 70/00* (2014.12); *C01B 32/194* (2017.08); *B29K 2101/10* (2013.01); *B29K 2995/0007* (2013.01); *B29L 2031/753* (2013.01); *B29L 2031/779* (2013.01); *B33Y 80/00* (2014.12); *H05B 2203/011* (2013.01); *H05B 2203/014* (2013.01)

(58) Field of Classification Search
USPC .................................. 264/271.1, 279, 279.1
See application file for complete search history.

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,599,604 A * | 2/1997 | Goettsch | B60C 9/0042 428/105 |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,531,191 B1 * | 3/2003 | Notenboom | C03C 17/25 427/554 |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |

(56) References Cited

U.S. PATENT DOCUMENTS

| | | |
|---|---|---|
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0015061 A1* | 1/2017 | Lewicki ............... B29C 64/118 |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).
C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).
Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.
Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995). cited by applicant.
M. Martin-Gallego et al., Epoxy-Graphene UV-Cured Nanocomposites, Polymer, vol. 52, Issue 21, pp. 4664-4669 (Sep. 2011).
P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).
S Kumar & J.-P. Kruth, Composites by Rapid Prototyping Technology, Materials and Design, (Feb. 2009).
S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).
T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

* cited by examiner

ADDITIVE MANUFACTURING SYSTEM AND METHOD FOR DISCHARGING COATED CONTINUOUS COMPOSITES

RELATED APPLICATIONS

This application is based on and claims the benefit of priority from U.S. Provisional Application No. 62/459,398 that was filed on Feb. 15, 2017, the contents of which are expressly incorporated herein by reference.

TECHNICAL FIELD

The present disclosure relates generally to a manufacturing system and method and, more particularly, to an additive manufacturing system and method for discharging coated continuous composites.

BACKGROUND

Continuous fiber 3D printing (a.k.a., CF3D™) involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a liquid thermoset (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although continuous fiber 3D printing provides for increased strength, compared to manufacturing processes that do not utilize continuous fiber reinforcement, applications may exist that could benefit from additional material properties not heretofore available.

The disclosed system and method are directed to addressing one or more of the problems set forth above and/or other problems of the prior art.

SUMMARY

In one aspect, the present disclosure is directed to a method of additively manufacturing a composite structure. The method may include directing into a print head a continuous reinforcement, and at least partially coating the continuous reinforcement with a liquid matrix inside the print head. The method may also include applying particles to the liquid matrix on the continuous reinforcement, and discharging from the print head a track containing the continuous reinforcement. The method may further include exposing the track to energy to cause the particles to sinter.

In another aspect, the present disclosure is directed to a print head for an additive manufacturing system. The print head may include at least one of a matrix jet and a matrix bath configured to wet a continuous reinforcement passing through the print head with a liquid matrix. The print head may also include a coating mechanism configured to dispense at least one of metallic and ceramic particles onto the wetted continuous reinforcement. The print head may further include at least one cure enhancer configured to at least one of cure the liquid matrix and cause the at least one of metallic and ceramic particles to coalesce around the continuous reinforcement during discharge from the print head.

In yet another aspect, the present disclosure is directed to a system for additively manufacturing a composite structure. The system may include a print head configured to receive a continuous reinforcement, and at least one of a matrix jet and a matrix bath configured to wet the continuous reinforcement with a liquid matrix during passage through the print head. The system may also include a coating mechanism configured to dispense at least one of metallic and ceramic particles onto the wetted continuous reinforcement during passage through the print head, and at least one cure enhancer configured to at least one of cure the liquid matrix and cause the at least one of metallic and ceramic particles to coalesce around the continuous reinforcement. The system may further include a support configured to move the print head in multiple dimensions during discharging.

DETAILED DESCRIPTION

Figure 1:
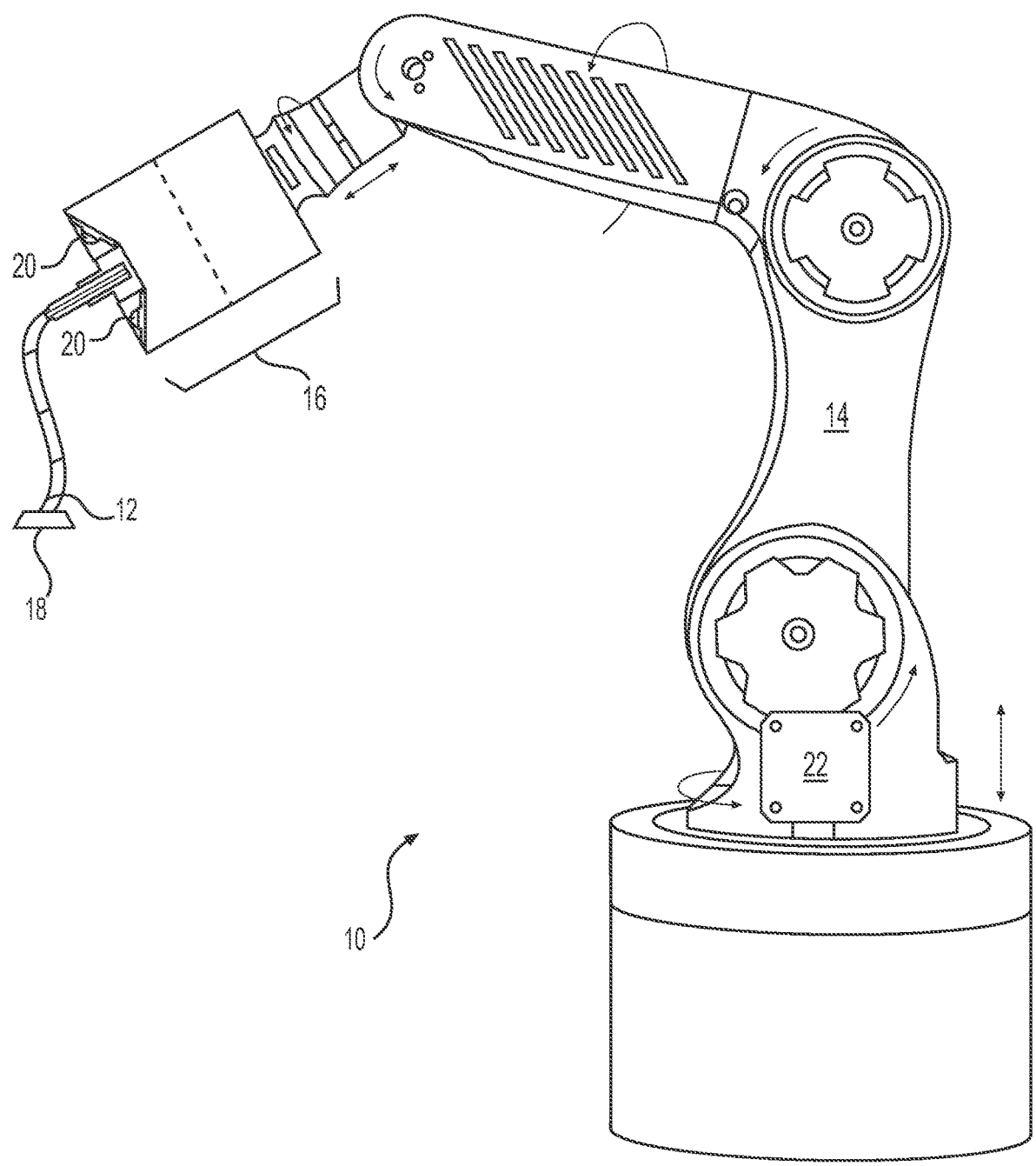
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of 6-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix. The matrix may include any type of material (e.g., a liquid resin, such as a zero volatile organic compound resin; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for the same reason. In either situation, head 16 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools—not shown). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., at least partially coated with) the matrix while the reinforcements are passing through head 16. The matrix, dry reinforcements, and/or reinforcements that are already exposed to the matrix (a.k.a., wetted reinforcements) may be transported into head 16 in any manner apparent to one skilled in the art.

The matrix and reinforcement may be discharged from head 16 as a track, ribbon, or sheet of composite material via at least two different modes of operation. In a first mode of operation, the matrix and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the composite material is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. For example, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of reinforcement through head 16 could be assisted (e.g., via one or more internal and/or external feed mechanisms—not shown), if desired. However, the discharge rate of reinforcement from head 16 may primarily be the result of relative movement between head 16 and anchor point 18, such that tension is created and maintained within the reinforcement. It is contemplated that anchor point 18 could be moved away from head 16 instead of or in addition to head 16 being moved away from anchor point 18.

One or more cure enhancers (e.g., a UV light, an ultrasonic emitter, a laser, a heater, a catalyst dispenser, etc.) 20 may be mounted proximate (e.g., within, on, and/or trailing from) head 16 and configured to enhance a cure rate and/or quality of the matrix as it is discharged from head 16. Cure enhancer 20 may be controlled to selectively expose internal and/or external surfaces of structure 12 to energy (e.g., UV light, electromagnetic radiation, vibrations, heat, a chemical catalyst, hardener, or initiator, etc.) during the formation of structure 12. The energy may increase a rate of chemical reaction occurring within the matrix, harden the material, or otherwise cause the material to achieve a desired state as it discharges from head 16. It is contemplated that cure enhancers 20 may be omitted, in some embodiments.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of lookup tables, graphs, and/or equations. In the disclosed embodiment, the maps are used by controller 22 to determine desired characteristics of cure enhancers 20, the matrix, and/or the reinforcements at different locations within structure 12. The characteristics may include, among others, a type, quantity, and/or configuration of reinforcement and/or matrix to be discharged at a particular location within structure 12, and/or an amount, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20 such that structure 12 is produced in a desired manner.

Figure 2:
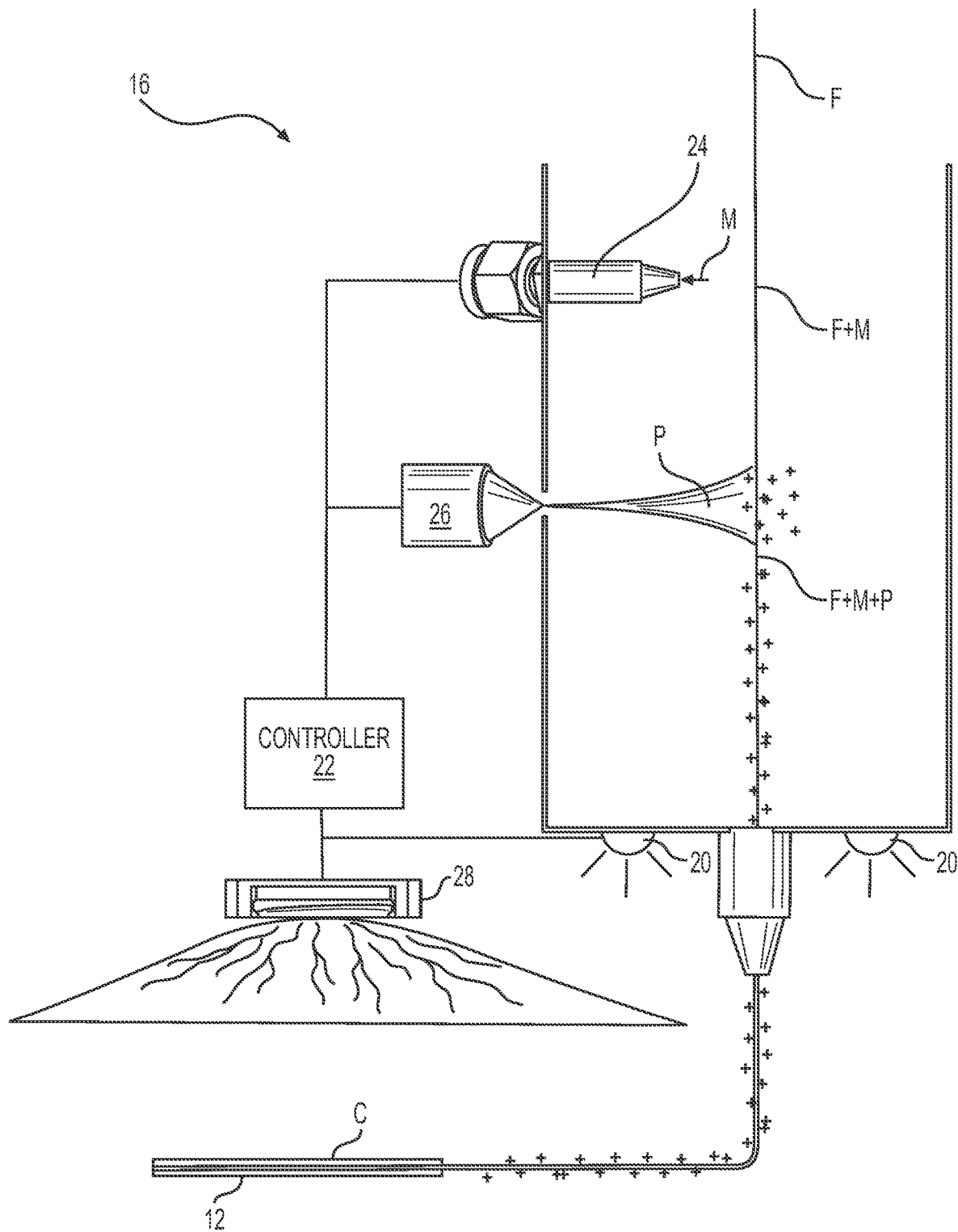
FIGS. 2 and 3 are enlarged diagrammatic illustrations of exemplary disclosed portions of the manufacturing system of FIG. 1.

In some applications, the reinforcements discharging from head 16 may need to be coated with specialized materials (e.g., other than or in addition to the matrix material described above), in order to give structure 12 particular properties. For example, the reinforcements (illustrated as fibers and represented by F in FIG. 2) may benefit from a metallic and/or ceramic coating C (shown in FIG. 2) that provides a desired hardness, rigidity, conductivity (e.g., heat and/or electricity conductivity), smoothness, lubricity, etc. In this example, the fibers F, after formation of the coating C, may function as a structural support core for the coating C. In another example, post processing may actually remove the support core (e.g., via heating or rinsing), such that the coating C becomes a hollow tube. This may result in a lighter structure and/or provide conduits for ventilation, heating, cooling, signal transmission, etc.

The fibers F may be coated with matrix (represented as M in FIG. 2) while passing through head 16, prior to receiving coating C. For example, one or more resin jets 24 may be located inside of head 16 and arranged to spray each fiber F or grouping of fibers F with matrix M as the fibers F pass axially by jets 24. In another example, the fibers F may pass through a bath and become saturated with matrix M prior to being coated with metallic and/or ceramic material. It is also contemplated that a combination of bath(s) and jet(s) may be used to apply the matrix M, in some examples.

The matrix M may be applied to the fibers F for multiple purposes. For instance, the matrix M may function as an adhesive, to help bind the metallic and/or ceramic material to the fibers F. This may improve a stability of the metallic and/or ceramic material during discharge from head 16. That is, the matrix M may reduce an amount of the metallic and/or ceramic material that falls off the fibers F during passage through a nozzle of head 16. Additionally or alternatively, the matrix M may be a rosin or another type of flux that helps the metallic and/or ceramic materials to flow and coalesce during post-processing, which will be explained in more detail below.

Precursors of the coating C may be applied to the matrix-encapsulated fibers M+F at a downstream location by way of one or more coating jets 26. Specifically, coating jet(s) 26 may be located to dispense metallic and/or ceramic particles P onto the wetted fibers M+F. The particles P may stick to the wetted fibers M+F and be discharged from head 16 in the manner described above (e.g., via extrusion and/or pultrusion).

Thereafter, at a location outside of head 16, one or more coating cure enhancers 28 (e.g., a heat source, such as an infrared lamp or high-power lasers) may cause the particles P to sinter and/or coalesce (e.g., to melt and flow together) around the fibers F. Although a single coating cure enhancer 28 is shown as being located downstream of cure enhancers 20, it is contemplated that other arrangements may be possible. For example, cure enhancers 20 could alternatively be used to both cure the matrix M and sinter and/or coalesce the particles P at the same time (i.e., without requiring use of coating cure enhancers 28), or curing of the matrix M could occur downstream of where coating cure enhancer(s) 28 are located (e.g., to cure the matrix M through a transparent coating made up of the particles P). It is also contemplated that cure enhancers 20 may not be required, in some applications, and that coating cure enhancer(s) 28 may both cure matrix M and sinter/coalesce particles P.

Figure 3:
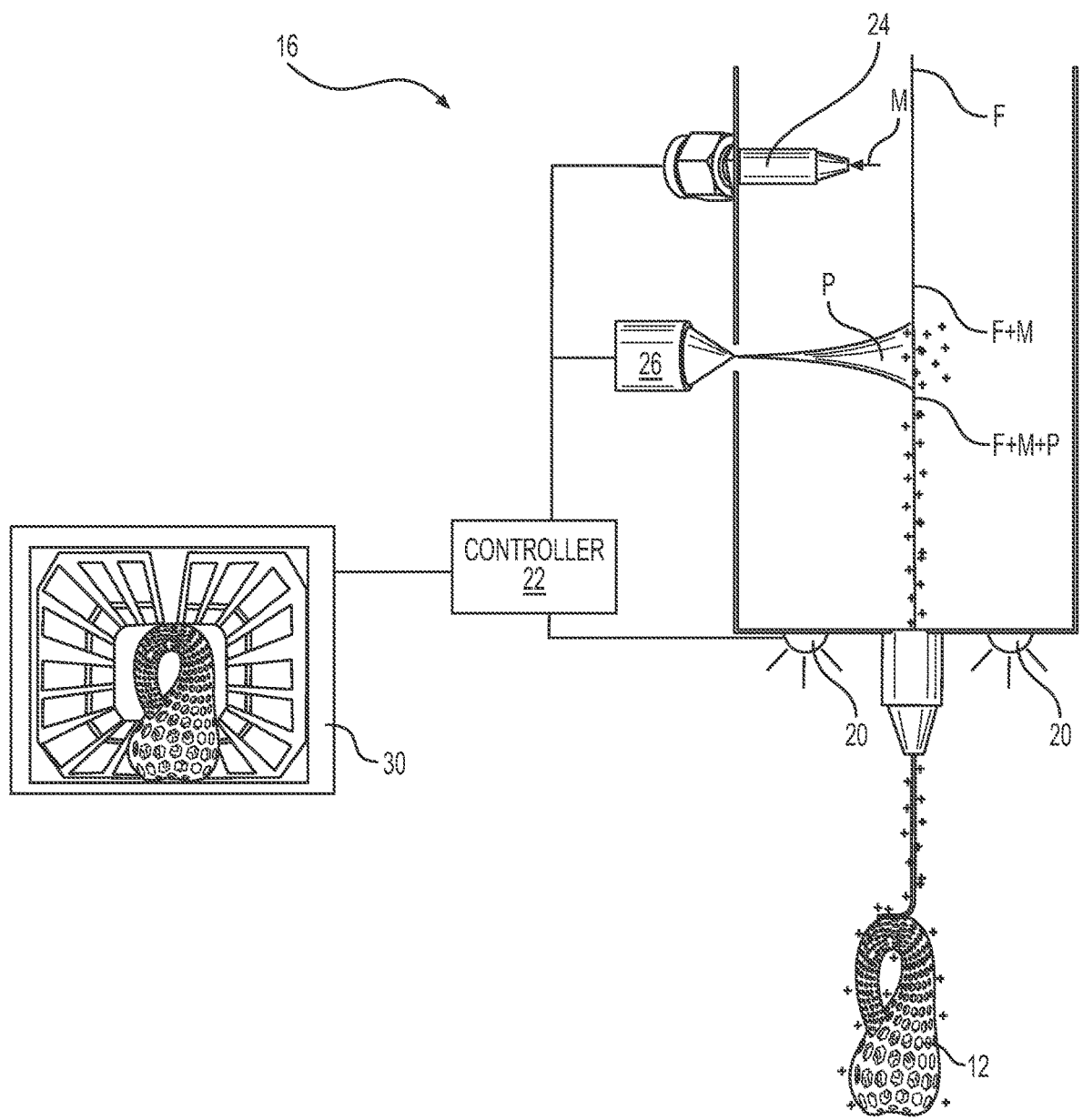

Another embodiment of system 10 and head 16 is shown in FIG. 3. In this embodiment, rather than causing the particles P to sinter and coalesce around fibers F immediately after discharge from head 16 (e.g., during formation of individual layers of structure 12), multiple layers (e.g., all) of structure 12 may first be formed prior to exposing the particles P to an elevated energy levels. For example, at some point during the fabrication of structure 12 (e.g., after completion or after reaching an earlier fabrication milestone), structure 12 may be placed in the vicinity of (e.g., inside of) a coating cure enhancer 30. Structure 12 may then be exposed to energy (e.g., heat, vibrations, and/or pressure) that causes the particles P on multiple layers of structure 12 to simultaneously cure, sinter, and/or coalesce. The fibers F may be melted and/or rinsed away at this same time or shortly thereafter, if desired.

INDUSTRIAL APPLICABILITY

The disclosed system may be used to continuously manufacture composite structures having any desired cross-sectional shape, length, density, and/or strength. The composite structures may include any number of different reinforcements of the same or different types, diameters, shapes, configurations, and consists, and/or any number of different matrixes. Operation of system 10 will now be described in detail.

At a start of a manufacturing event, information regarding a desired structure 12 may be loaded into system 10 (e.g., into controller 22 that is responsible for regulating operation of support 14, cure enhancer(s) 20, jet(s) 24, jet(s) 26, coating cure enhancer(s) 28 and 30, and/or any other associated components). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), location-specific matrix stipulations, location-specific reinforcement stipulations, desired cure rates, cure locations, cure shapes, cure amounts, coating specifications, etc. It should be noted that this information may alternatively or additionally be loaded into system 10 at different times and/or continuously during the manufacturing event, if desired.

Based on the component information, a specific cure enhancer configuration may be connected to head 16, and one or more different (e.g., different sizes, shapes, and/or types of) reinforcements, matrixes, and/or coating particles may be selectively installed within system 10 and/or continuously supplied into head 16. The corresponding reinforcements (e.g., prepreg or dry fibers, tows, ribbons, or sheets) may be passed through one or more fiber-teasing mechanisms (e.g., between the bristles of adjacent brushes, and/or over or around protrusions, etc.—not shown), passed through a nozzle of head 16, and thereafter connected to a pulling machine (not shown) and/or to a mounting fixture (e.g., to anchor point 18). Installation of the matrix may include filling head 16 with a matrix and/or coupling of an extruder (not shown) to head 16.

Head 16 may be moved by support 14 under the regulation of controller 22 to cause matrix-encapsulated and particle-coated reinforcements to be placed against or on a corresponding anchor point 18. Cure enhancers 20 may then be selectively activated to cause hardening of the matrix surrounding the reinforcements, thereby bonding the reinforcements to anchor point 18. It should be noted that, during anchoring, the matrix-coated reinforcements may not be sprayed with metallic or ceramic particles, in some applications.

The component information may then be used to control operation of system 10. For example, the reinforcements may be pulled through the fiber-teasing mechanism; separated and/or flattened; submerged and/or sprayed within matrix, wrung out by any associated regulating device (not shown); and then discharged from head 16. Controller 22 selectively cause support 14 to move head 16 in a desired manner at this time, such that an axis of the resulting structure 12 follows a desired trajectory (e.g., a free-space, unsupported, 3-D trajectory). In addition, cure enhancers 20 and/or coating cure enhancer 28 may be selectively activated by controller 22 during material discharge to initiate, speed up, or complete hardening of the matrix and sintering of the associated coating particles. Once structure 12 has grown to a desired length, structure 12 may be disconnected (e.g., severed) from head 16 in any desired manner. At this point in time, the entire structure may additionally (or instead of being exposed to energy from coating cure enhancer 28) be placed inside coating cure enhancer 30, if desired, to cause the metallic and/or ceramic particles to sinter and coalesce.

It will be apparent to those skilled in the art that various modifications and variations can be made to the disclosed systems and head. Other embodiments will be apparent to those skilled in the art from consideration of the specification and practice of the disclosed systems and heads. For example, in some embodiments, it may beneficial to mechanically press the metallic and/or ceramic particles into the matrix prior to discharge from head 16. This may reduce an amount of the particles that are dislodged from the matrix during discharge. Rollers, dies, presses, covering nozzles, and other devices may be used for this purpose. It is intended that the specification and examples be considered as exemplary only, with a true scope being indicated by the following claims and their equivalents.

What is claimed is:

1. A method of additively manufacturing a composite structure, comprising:
    directing into a print head a continuous reinforcement;
    at least partially coating the continuous reinforcement with a liquid matrix inside the print head;
    applying dry particles to an outer surface of the liquid matrix on the continuous reinforcement;
    discharging from the print head a track containing the continuous reinforcement; and
    exposing the track to energy to cause the particles to sinter.

2. The method of claim 1, wherein exposing the track to energy includes exposing the track to energy as the track discharges from the print head.

3. The method of claim 2, wherein exposing the track to energy includes causing the continuous reinforcement to melt away.

4. The method of claim 2, wherein the continuous reinforcement remains intact after exposing the track to energy.

5. The method of claim 1, further including exposing the liquid matrix on the continuous reinforcement to energy to cause the liquid matrix to cure, prior to exposing the track to energy to cause the particles to sinter.

6. The method of claim 5, wherein:
    exposing the track to energy includes exposing the track to at least one of infrared heat and laser energy; and
    exposing the liquid matrix on the continuous reinforcement to energy includes exposing the liquid matrix to UV light.

7. The method of claim 1, wherein exposing the track to energy includes exposing all tracks making up the composite structure to energy at the same time, after the composite structure is formed.

8. The method of claim 1, further including moving the print head in multiple dimensions during discharging of the track.

9. A method of additively manufacturing a composite structure, comprising:
    directing into a print head a continuous reinforcement;
    at least partially coating the continuous reinforcement with a liquid matrix inside the print head;
    applying at least one of metallic particles and ceramic particles to the liquid matrix on the continuous reinforcement;
    discharging from the print head a track containing the continuous reinforcement; and
    exposing the track to energy to cause the at least one of metallic particles and ceramic particles to sinter,
    wherein applying at least one of metallic particles and ceramic particles to the liquid matrix on the continuous reinforcement includes spraying the at least one of metallic particles and ceramic particles onto the liquid matrix prior to discharge of the continuous reinforcement from the print head.

10. The method of claim 9, wherein at least partially coating the continuous reinforcement with the liquid matrix includes at least one of spraying the continuous reinforcement with the liquid matrix and passing the continuous reinforcement through a bath of the liquid matrix.

11. The method of claim 10, wherein the liquid matrix is a flux configured to facilitate coalescence of the at least one of metallic particles and ceramic particles.

12. A method of additively manufacturing a composite structure, comprising:
    discharging a continuous reinforcement that is wetted with a liquid matrix from a print head;
    moving the print head during discharging to shape the composite structure;
    exposing the liquid matrix to energy from a first energy source to harden the liquid matrix and maintain the shape of the composite structure;
    applying particles to the wetted continuous reinforcement; and
    exposing the particles to energy from a second energy source to sinter the particles after the liquid matrix has hardened.

13. The method of claim 12, further including wetting the continuous reinforcement with the liquid matrix prior to applying the particles.

14. The method of claim 13, wherein the liquid matrix is a flux configured to facilitate coalescence of the particles.

15. The method of claim 12, wherein sintering the particles causing the continuous reinforcement to melt away.

16. The method of claim 12, wherein the continuous reinforcement remains intact after sintering of the particles.

17. The method of claim 12, wherein the particles include at least one of metallic particles and ceramic particles.

18. The method of claim 12, wherein applying particles to the liquid matrix on the continuous reinforcement includes applying the particles prior to discharge of the continuous reinforcement from the print head.

19. The method of claim 12, wherein the continuous reinforcement includes at least one of a fiber and a wire.

\* \* \* \* \*